United States Patent
Hodaei et al.

(10) Patent No.: US 10,698,667 B2
(45) Date of Patent: *Jun. 30, 2020

(54) COMPILER WITH TYPE INFERENCE AND TARGET CODE GENERATION

(71) Applicant: Microsoft Technology Licensing, LLC, Redmond, WA (US)

(72) Inventors: Darius Amir Hodaei, London (GB); Triinu Viilup, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,700

(22) Filed: Oct. 5, 2018

(65) Prior Publication Data

US 2019/0155587 A1    May 23, 2019

Related U.S. Application Data

(63) Continuation of application No. 15/380,592, filed on Dec. 15, 2016, now Pat. No. 10,203,940.

(51) Int. Cl.
*G06F 9/45*    (2006.01)
*G06F 8/41*    (2018.01)

(52) U.S. Cl.
CPC .............. *G06F 8/41* (2013.01); *G06F 8/437* (2013.01)

(58) Field of Classification Search
CPC .................................. G06F 8/41; G06F 8/437
USPC ................................................ 717/139–145
See application file for complete search history.

(56) References Cited

U.S. PATENT DOCUMENTS

| | | | | | |
|---|---|---|---|---|---|
| 5,142,681 | A * | 8/1992 | Driscoll | ................... | G06F 8/41 717/141 |
| 5,325,531 | A * | 6/1994 | McKeeman | .............. | G06F 8/20 717/112 |
| 5,530,863 | A * | 6/1996 | Hino | ....................... | G06F 8/311 717/146 |
| 5,748,966 | A * | 5/1998 | Sato | ........................ | G06F 8/437 717/116 |
| 6,018,628 | A * | 1/2000 | Stoutamire | ............. | G06F 8/437 717/118 |
| 6,381,738 | B1 * | 4/2002 | Choi | ....................... | G06F 8/443 711/E12.006 |
| 6,560,774 | B1 * | 5/2003 | Gordon | ............... | G06F 9/44589 717/114 |
| 6,836,877 | B1 * | 12/2004 | Dupenloup | ......... | G06F 17/5045 716/103 |

(Continued)

OTHER PUBLICATIONS

Hackett et al, "Fast and Precise Hybrid Type Inference for JavaScript", ACM, pp. 239-249 (Year: 2012).*

(Continued)

*Primary Examiner* — Anil Khatri (57) ABSTRACT

Systems and methods for a compiler with type inference is described herein. The compiler includes a computer program having one or more variables and context of the variables. The compiler has a type selector to infer a type of the variable using the context of the variable and dereference the variable using the inferred type. Prior to executing the computer program, the compiler carries out a type check of the variable by accessing a recommended type of the variable and comparing the recommended type and the types associated with the context of the variable.

20 Claims, 8 Drawing Sheets

(56) References Cited

U.S. PATENT DOCUMENTS

| | | | | |
|---|---|---|---|---|
| 6,981,249 | B1* | 12/2005 | Knoblock | G06F 8/73 |
| | | | | 717/141 |
| 7,493,610 | B1* | 2/2009 | Onodera | G06F 9/4484 |
| | | | | 717/155 |
| 7,774,376 | B1* | 8/2010 | Meijer | G06F 8/315 |
| | | | | 707/802 |
| 8,839,218 | B2* | 9/2014 | Bowler | G06F 8/443 |
| | | | | 717/158 |
| 8,930,927 | B2* | 1/2015 | Bowler | G06F 11/366 |
| | | | | 717/140 |
| 8,954,939 | B2* | 2/2015 | Mameri | G06F 8/427 |
| | | | | 717/140 |
| 9,003,384 | B2* | 4/2015 | Pizlo | G06F 8/443 |
| | | | | 717/100 |
| 9,009,681 | B2* | 4/2015 | Schmidt | G06F 8/443 |
| | | | | 717/130 |
| 9,038,037 | B1* | 5/2015 | Biggerstaff | G06F 8/72 |
| | | | | 717/108 |
| 9,207,914 | B2* | 12/2015 | Miadowicz | G06F 8/31 |
| 9,921,815 | B2* | 3/2018 | Riche | G06F 8/433 |
| 10,025,566 | B1* | 7/2018 | Ahmed | G06F 8/35 |
| 2004/0083454 | A1* | 4/2004 | Bigus | G06N 5/04 |
| | | | | 717/117 |

OTHER PUBLICATIONS

Chandra et al, "Type Inference for Static Compilation of JavaScript", ACM, pp. 410-429 (Year: 2016).*

Bellamy et al, "Efficient Local Type Inference", ACM, pp. 475-491 (Year: 2008).*

Plevyak et al, "Precise Concrete Type Inference for Object-Oriented Languages", ACM, pp. 324-340 (Year: 1994).*

Aiken et al, "Type Inclusion Constraints and Type Inference", ACM, pp. 31-41 (Year: 1993).*

Ohori et al, "Type Inference with Rank 1 Polymorphism for Type-Directed Compilation of ML", ACM, pp. 160-171 (Year: 1999).*

Suzuki, "Inferring Types in Smalltalk", ACM, pp. 187-199 (Year: 1981).*

Levy, "Type Checking, Separate Compilation and Reusability", ACM, pp. 285-289 (Year: 1984).*

"Type Inference", Retrieved from: https://en.wikipedia.org/wiki/Type_inference, Dec. 6, 2019, 5 Pages.

"Type Inference", Retrieved from: https://en.wikipedia.org/w/index.php?title=Type_inference&oldid=753512973, Dec. 7, 2016, 5 Pages.

* cited by examiner

COMPILER WITH TYPE INFERENCE AND TARGET CODE GENERATION

PRIORITY INFORMATION

This application is a continuation application of and claims priority to U.S. patent application Ser. No. 15/380,592, entitled "COMPILER WITH TYPE INFERENCE AND TARGET CODE GENERATION," filed on Dec. 15, 2016, the disclosure of which is incorporated herein by reference in its entirety.

COPYRIGHT NOTICE

A portion of the disclosure of this patent contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Compilers are used to translate computer source code from a higher level computing language into a lower level computing language such as machine code for executing on computer hardware. This enables a programmer to create source code in a high level language without particular consideration of the computer hardware to be used. The compiler carries out various tasks including verifying syntax and semantics of the source code, type checking, code optimization, and generation of target code to be executed on computer hardware.

A compiler often has a built in type system comprising a plurality of rules for associating a property (referred to as a type) with each computed value. These types are used by the compiler for type checking which identifies type errors in the source code and generates alerts so that bugs can be identified semantic errors and memory errors prevented. A type checker checks if operations expecting a certain type are being used with types for which that operation is not logical. Type systems may also be used for optimizations carried out by the compiler, to facilitate documentation and for multiple dispatch.

The embodiments described below are not limited to implementations which solve any or all of the disadvantages of known compilers.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A compiler is described which has a processor configured to receive a computer program comprising a plurality of instructions, the instructions comprising one or more variables and context of the variables. The compiler has a type selector configured, upon evaluation of an instruction comprising a variable by the compiler, to infer a type of the variable using the context of the variable and to dereference the variable using the inferred type Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Existing compilers have type systems which explicitly assign a type to each variable of a computer program. This is done when the type system resolves the type of a variable statically (i.e. at compile time) or when the variable is assigned a value during dynamic typing. The result of resolving the type of a variable in these existing compilers persists and is able to inform later type resolving processes. This ability of previous results to inform later ones is referred to as "memoization". The term "memoization" in this context means caching or storing the results corresponding to some set of specific inputs to a type casting operation whereby the type of a variable is resolved. Subsequent calls to the type casting operation, with remembered inputs, return the remembered result rather than recalculating it. This reduces the computational costs of computing the type casting operation.

It is recognized herein that the memoization aspect of previous compilers is restrictive and reduces the flexibility and adaptability of computing devices having compilers. Source code input to existing compilers triggers type checking errors where pieces of data of different formats are used for variables of a fixed type and the data is incompatible with the fixed type. This means that programmers need to carefully specify types of variables in source code that they author or edit and take care to avoid incompatible types which lead to type checking errors, memory errors and other malfunctioning. This makes the computing device with the compiler difficult to use. However, such existing compilers are useful in that once the programmer has fixed the bugs which led to the type checking errors a safe working program results.

Consider the case of an author creating source code for a user interface component of a video communications service. The author selects a user interface component template which takes a plurality of input parameters. The author has several pieces of data such as a string, a number, a color and would like to use these for various individual ones of the input parameters. Using a compiler of the present technology the author is able to use the pieces of data as input parameters to the component template without worrying about the types of the pieces of data. The compiler checks the context of a variable and infers the type of the variable from the context. In this way a piece of data such as "hello" may be inferred as having a different type according to the context. If the piece of data is in a context associated with text to be displayed on a user interface button the data is inferred to have the type string. If the piece of data is in a different context it may be inferred to have a different type. This gives a more flexible, better computer. In contrast, previous compilers resolve the type of a variable statically or when the variable is assigned a value; and the type of the variable then persists and is able to influence ongoing type casting of variables. Using these previous compilers an author of the user interface component must carefully specify the types of the input parameters so that these are consistent with the type system used by the compiler.

Figure 1:
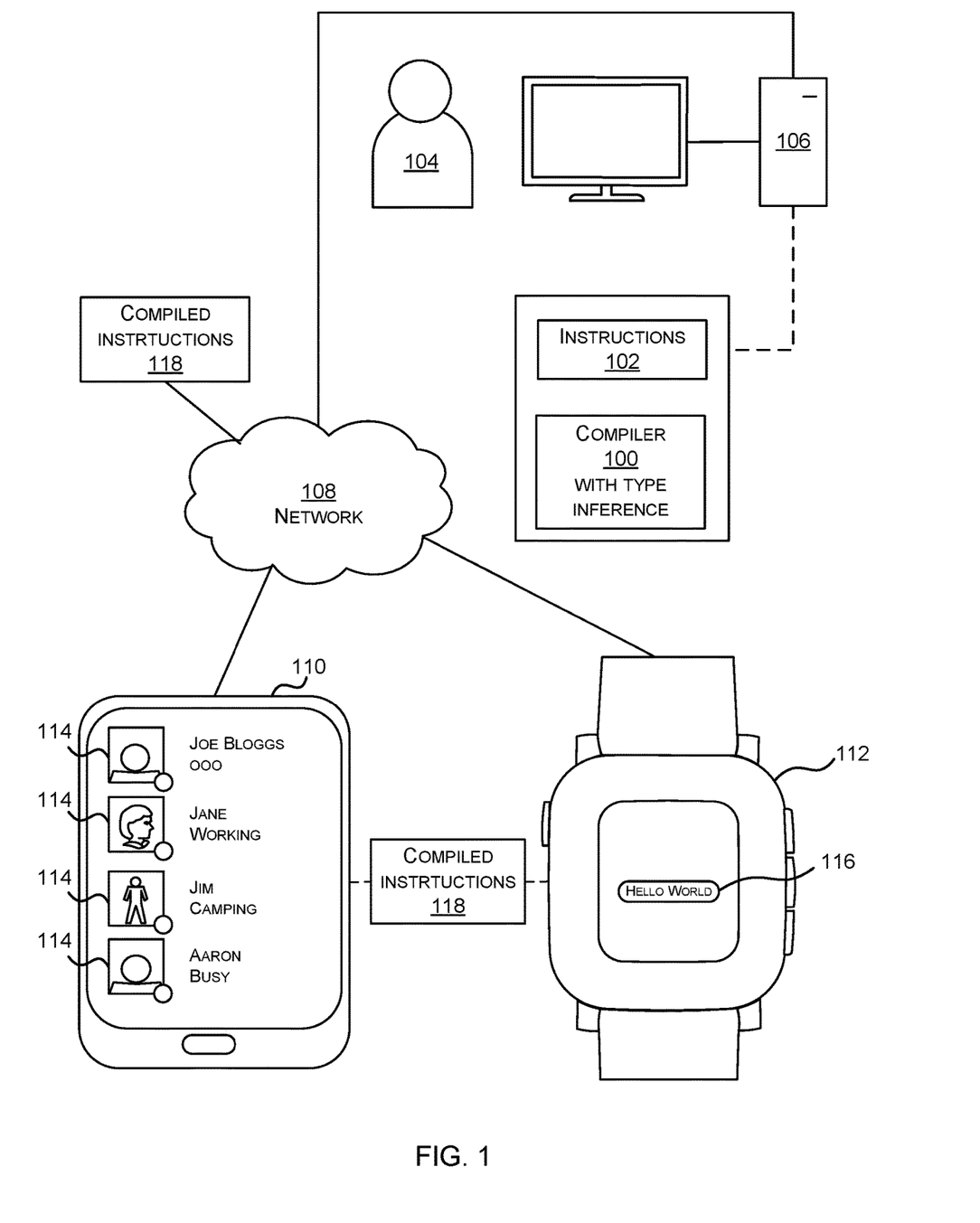
FIG. 1 is a schematic diagram of a compiler which generates compiled instructions to be executed by various computing devices.

FIG. 1 is a schematic diagram of a compiler 100 with type inference at a desktop computing device 106 operated by author 104. The author 104 has created a computer program comprising instructions 102 which are stored at the desktop computing device 106 and these instructions 102 are referred to as source code. The compiler 100 translates the instructions 102 into compiled instructions 118 which may be executed at the desktop computing device 106. The compiled instructions, when executed, provide functionality such as a video communications service or any other functionality. Although the examples described herein refer to a video communications service the scope of the technology is not limited to any particular type of application domain.

In the case that the compiled instructions 118 are used to provide a cloud service these instructions are stored at an entity connected to a communications network. End user devices such as smart phone 110, and smart watch 112 are able to access the functionality of the compiled instructions 118 over the communications network 108, for example to enable a video communications service to be accessed and used via the end user devices 110, 112. In some cases, the compiled instructions 118 are installed at the end user devices 110, 112 themselves. For example, where the compiled instructions 118 implement one or more user interface components of a video communications service at smart phone 110, user interface components 114 are displayed at a touch screen of the smart phone 110 to indicate participants of the video communications service, details of those participants and a current status of those participants. For example, where the compiled instructions 118 implement an interactive button at smart watch 112 the interactive button 116 is displayed at the touch screen of the smart watch 112.

As the compiler 100 has a type system which infers the type of variables using context of those variables the computing device 106 is extremely flexible. The author 104 is able to input pieces of data to the computing device 106 and use these in the instructions 102 in a manner which is not restricted by type of the pieces of data. This facilitates the ability of the computing device 106 to operate without crashing and to provide the functionality the author 104 intended. Using the type system of the present technology, variables do not have fixed types. At any given time, the type of a given variable depends on the context in which it is interrogated. Interrogating the type of the same variable in different contexts may result in two unrelated types. The type of the variable is not set to a given type once dereferenced and held until another assignment to the same variable "overwrites" it. The variable type is functionally pure from context to context (i.e. unchanged as a result of the implicit type conversions it undergoes).

Figure 2:
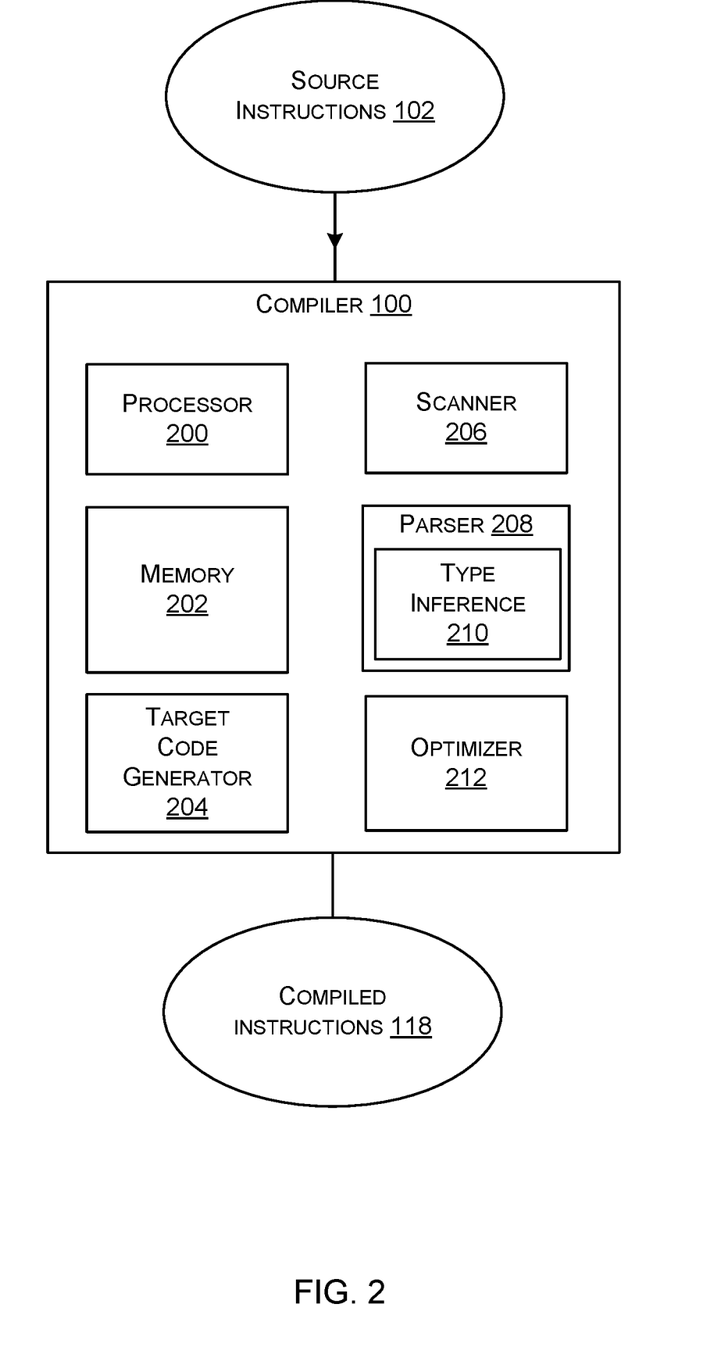
FIG. 2 is a schematic diagram of a compiler such as the compiler of FIG. 1.

FIG. 2 is a schematic diagram of a user interface of a software development environment used by author 104 at computing device 106. Source code created by author 104 is visible in part in a bottom right pane of the user interface and a user interface component 120 generated by the source code is visible in part at a top right pane. In this case the user interface component comprises a column of icons on the left hand side, each icon representing a participant of a video communications service and having details about the participant and a current status of the participant (i.e. whether the participant is currently online). The user interface component comprises a display of text representing instant messages sent or received by a dummy user of the video communications system.

The lower right hand pane of the user interface shows part of the source code, which in this case is written in the universal extensible markup language (UXML) programming language. However, this is an example and is not intended to limit the scope of the technology, as any computer programming language may be used.

Figure 1A:
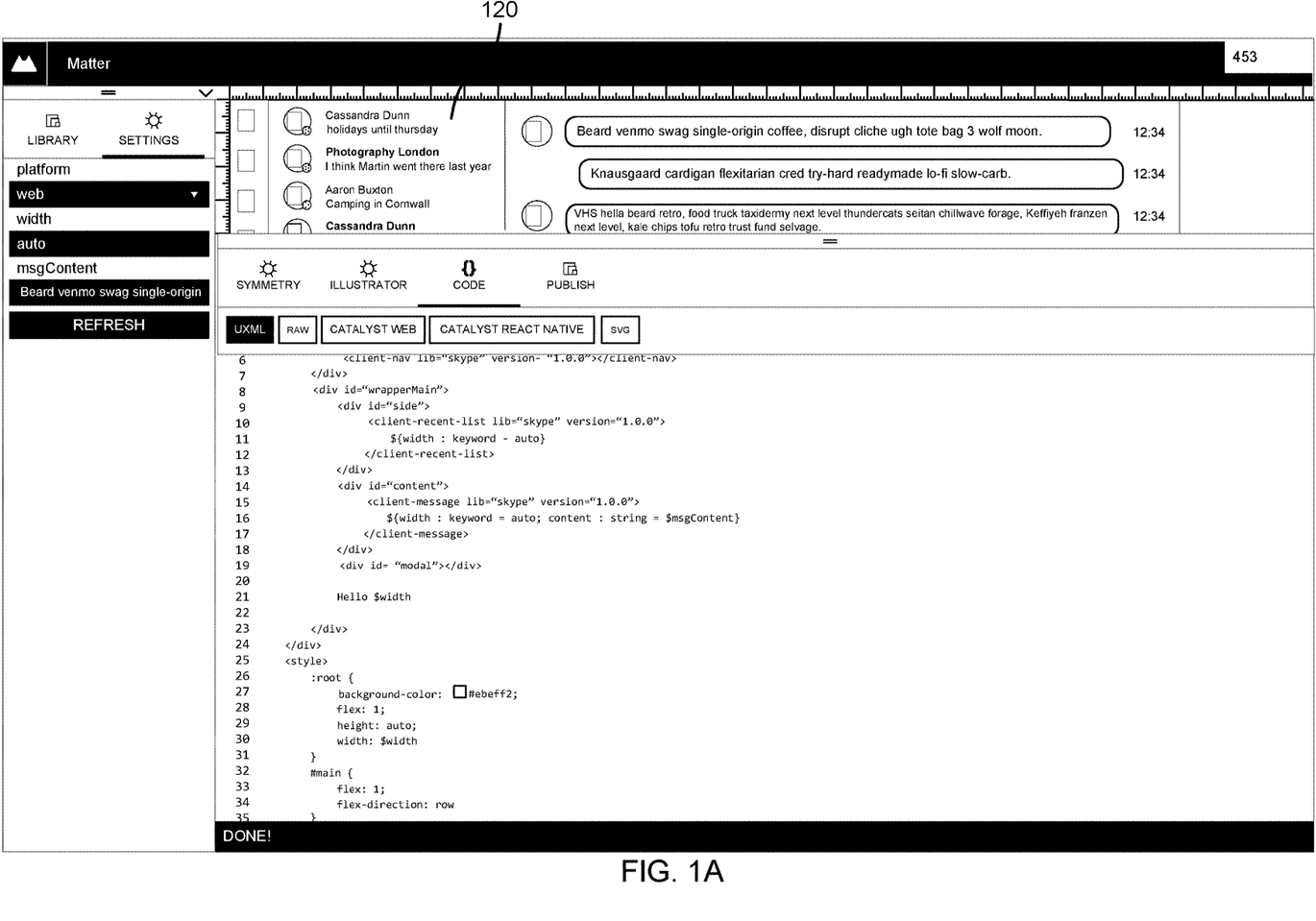
FIG. 1A is a schematic diagram of source code and of a user interface component generated by the source code.

In the source code illustrated in FIG. 1A there are two variables indicated by the "$" sign and these are msgContent and width. In line 16 the variable width is set to be the keyword auto and the variable content is set to be the string which is found in the variable msgContent. As explained in the settings on the left hand side, the msgContent variable is set to "Beard venom swag single-origin coffee, disrupt cliché ugh tote bag 3 wolf moon."

When the type system of compiler 100 encounters variable width in line 21 it finds the context of that variable. In this case the context of variable width in line 16 is a text literal and the type is inferred as string. When the type system of compiler 100 encounters variable width in line 30 it finds the context of that variable which is a style context since line 25 specifies a style. In this case the type of the variable width in line 30 is inferred as an integer and is used to set the width of the user interface component 120. (Note that "auto" is an acceptable integer value for the style "width" in this example). Each context is associated with one or more possible types and this information is used by the type system to infer the type of the variables using the context of the variables.

Figure 3:
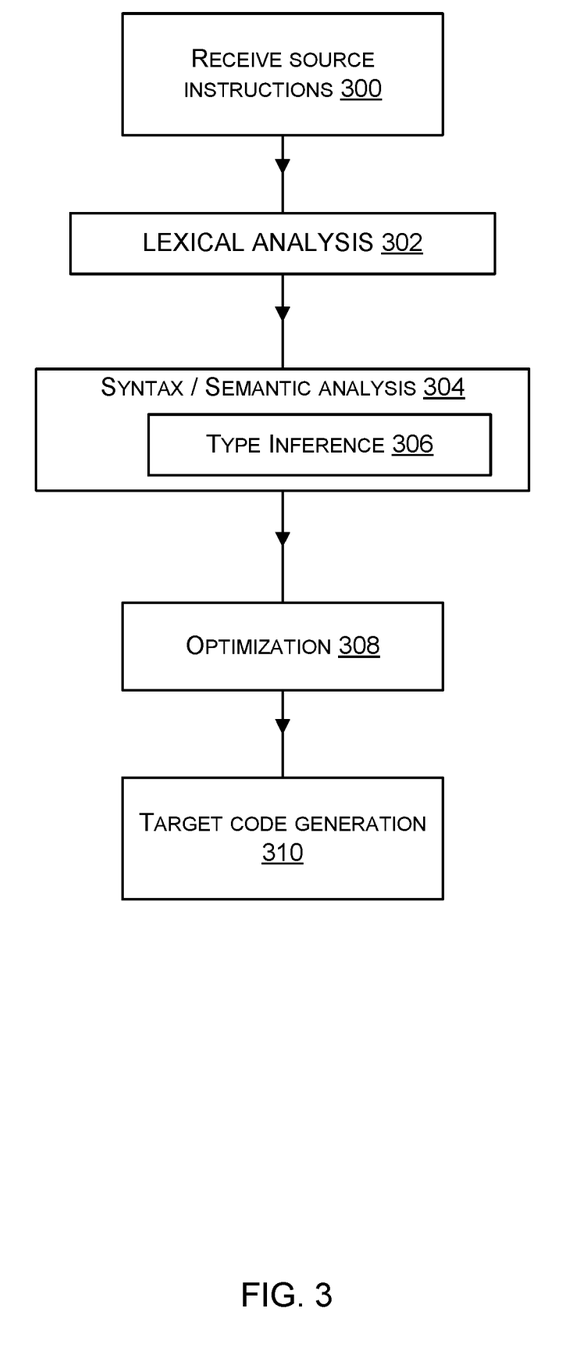
FIG. 3 is a flow diagram of a method of operation at the compiler of FIG. 1A.

FIG. 3 is a schematic diagram of the compiler 100 of FIG. 1 in more detail. It comprises one or more processors 200, a memory 202, a scanner 206, a parser 208, an optimizer 212 and a target code generator 204. The parser 208 includes a type inference component 210. The compiler 100 receives source instructions 102 and computes compiled instructions 118.

The scanner 206 carries out a lexical analysis of the source instructions 102 in order to break down the source instructions into atomic units called tokens, such as keywords, identifiers and symbol names.

The parser 208 checks syntax of the output of the scanner 106. This comprises building a parse tree. A parse tree replaces the linear sequence of tokens from the lexical analysis into a tree structure according to rules of syntax of the programming language used to write the source code. The parser transforms the parse tree into an abstract syntax tree by adding semantic information to the parse tree. The parser 208 also builds a symbol table which maps each symbol in the source instructions to information such as a location, and scope of that symbol. In a traditional compiler, the parser 208 includes in the symbol table types of various ones of the symbols in the source instructions so that variables are assigned a type. In contrast, the parser 208 of the present technology has a type inference component 210 which operates so that variables are not assigned fixed types.

The type inference component 210 has a plurality of delegate functions each responsible for a particular context. A the point of encountering a variable, the compiler passes the variable to the delegate function for the incident context. The delegate function then decides on the type of the variable using context specific rules. The type inference component has details about how to identify contexts by inspecting the source instructions to find particular keywords and/or syntax. A non-exhaustive list of possible contexts is: style definition, query predicate, text literal, query context where expressions evaluate to true or false, source context where expressions evaluate to a universal resource locator (URL), an icon source context, an image source context, an import parameters context. In an example, the type inference component 210 identifies a style definition context by searching for the keyword "style" in the source instructions. Any variables within a specified number of lines of the keyword are identified as having the style context. The same process is used to find other contexts and identify variables having those contexts. In the case of a query predicate context, an example of syntax searched for is the XML (extensible mark up language) tag attribute-query=" . . . ". However, this is an example only and is not intended to limit the scope of the technology. Any syntax which represents a query may be searched for. In the case of a query predicate context a non-exhaustive list of examples of keywords searched for is: auto, none, platform, orientation, width, height, off, on, maxWidth, minWidth, maxHeight, minHeight. In the case of a text literal context, an example of syntax searched for is the prefix $, or ${ }, where the braces { } do not fall within another stronger-binding context such as a style, import or query. An example of syntax representing a text literal context is found on line 21 of FIG. 1A, contrasted with line 30 of FIG. 1A which shows the same syntax within a stronger-binding style context. A variable can be dereferenced in multiple, myriad contexts throughout the incident component template or other source instructions.

The type inference component 210 has information about which types are possible for which contexts. Each context has one or more types associated with it and the association is specified, for example, by a manufacturer of the compiler, or by the author 104. That is, authors may declare what types variables are covariant to for a given context in order for expressions therein to pass a type check. A variable in a given context is inferred to have a type which is one of the types which are possible for that context. The type inference component, when it encounters a variable in the output of the scanner, looks up the context(s) for the variable from the symbol table. If there are more than two types associated with the context(s) of the variable, the type inference component 210 is able to randomly select one of the types to use for the variable. In other cases, rather than using random selection, the types are prioritized and the type inference component selects the type to use for the variable which is associated with the context and which has the highest priority. The priorities of the types are pre-configured by a manufacturer of the compiler 100 or are set by author 104. Once a type has been inferred it is used for type checking or other purposes. However, the inferred type does not persist and is not stored or assigned to the variable.

The optimizer 212 is optional and acts to modify intermediate code, generated from the output of the parser 208, in order to give computational efficiencies.

The target code generator 204 computes the compiled instructions for a particular computing platform from the optimized intermediate code, or from the output of the parser. In some cases the target code generator 204 computes more than one set of compiled instructions, one set for each of a plurality of different computing platforms.

Alternatively, or in addition, the functionality of the compiler described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

FIG. 3 is a flow diagram of a method of operation at compiler 100 of FIG. 1. The compiler receives source instructions 300 such as source instructions written by author 104 at computing device 106. The compiler carries out a lexical analysis 302 of the source instructions 300 by breaking down the source instructions into atomic units called tokens, such as keywords, identifiers and symbol names. The compiler then carries out an analysis 304 of syntax and/or semantics of the source instructions and as part of this analysis type inference 306 is done. The type inference 306 operates so that variables are not assigned fixed types as described above with reference to FIG. 2. The syntax/semantic analysis 304 comprises building a parse tree from the tokens produced by the lexical analysis 302. The parse tree is formed according to rules of syntax of the programming language used to write the source code. The compiler transforms the parse tree into an abstract syntax tree as described above and also builds a symbol table which maps each symbol in the source instructions to information such as a location, and scope of that symbol.

The type inference 306 process comprises identifying context of variables and inferring a type of a variable using its context as described above.

An optional optimization process 308 is carried out by the compiler to make execution of the resulting compiled instructions more efficient. Any known optimization processes are used.

The optimized intermediate code generated by operation 308 is used to generate target code at operation 310. The target code comprises compiled instructions 118 for execution on a particular type of computing hardware. A plurality of types of target code are generated in some cases, for different types of computing hardware.

Figure 4:
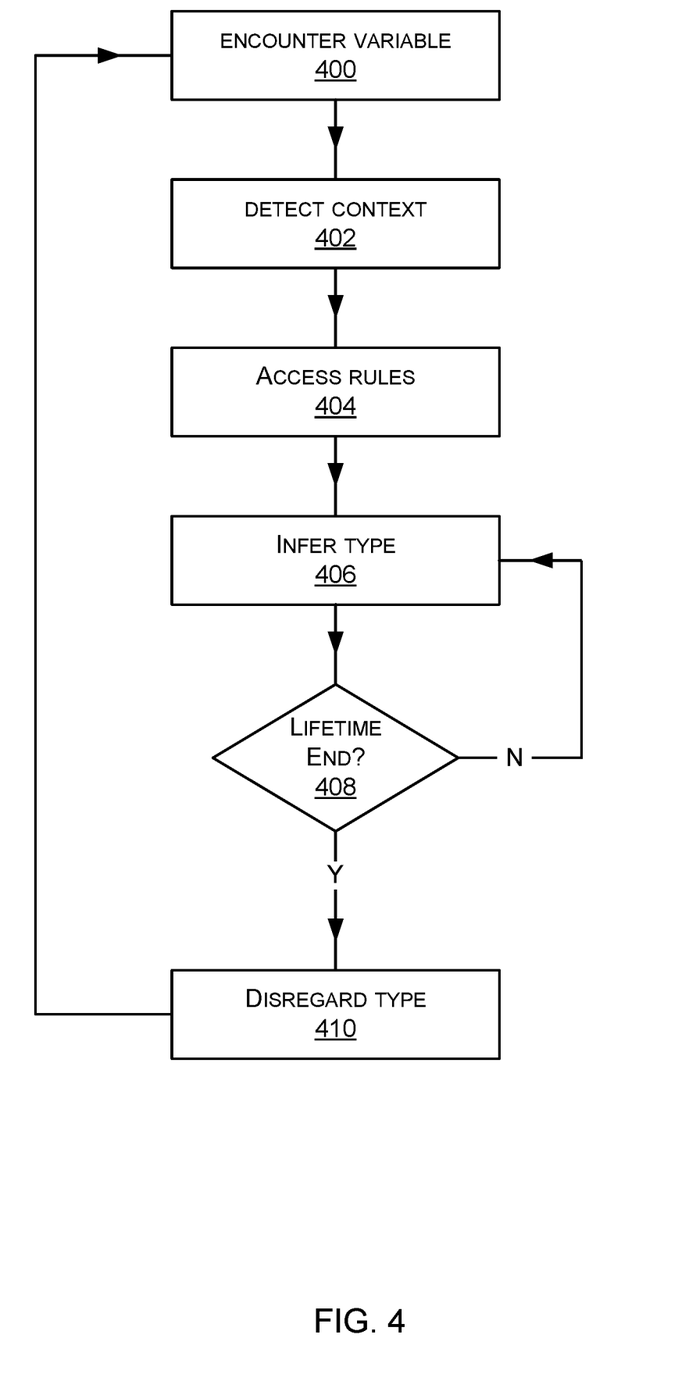
FIG. 4 is a flow diagram of another method of operation at the compiler of FIG. 1A.

FIG. 4 is a flow diagram of a method of operation at type inference component 210. This method is an example of operation at block 306 of FIG. 3. The type inference component 210 has access to the source instructions, the output of the lexical analysis 302 and the current state of the syntactic/semantic analysis. The type inference component evaluates the source instructions and each time a variable is encountered 400, if the type of the variable can be decided statically, it detects 402 context of that variable by searching for keywords or in other ways as described above. The type inference component accesses 404 one or more rules such as "if then" rules which specify which types are possible if one or more contexts apply to a variable. In some cases the types are prioritized as mentioned above. The type inference component infers 406 a type for the detected variable using the detected context and the rules. The priority information is also used to infer the type where the priority information is available. The variable is dereferenced using the inferred type.

In cases where the type inference component cannot infer the type of a variable statically, such as in the case that data is passed in via parameters, the compiler detects this and includes extra code in the output of the compiler. When the output of the compiler is executed at run time, the type inference is carried out as described in more detail below with reference to FIG. 6.

The type inference component does not assign a type explicitly to any piece of data, variable or otherwise. The type that a variable is regarded as is subject to the context in which it is dereferenced. A variable is dereferenced at the point in the flow of the compiled instructions where the value the variable currently holds is to be used by the compiled instructions when they are executed.

The inference that the type inference component makes is valid purely for the lifetime of the evaluation of the incident expression in which the variable is used. The incident expression is part of the source instructions in which the variable was encountered at operation 400. If this lifetime ends as indicated by the "yes" route from check point 408 of FIG. 4 the type of the variable is disregarded 410 or no longer usable and the process continues to evaluate by stepping through the source instructions until another variable is encountered and the method repeats from operation 400. If the evaluation of the incident expression is still ongoing the inferred type from operation 406 is used. As a result of the lifetime ending, the types that a variable may be cast to may be completely unrelated and have no commonality between them.

Static type checking is carried out by the type inference component 210 at compile time. Compile time means at the time of computation of the compiled instructions from the source instructions. The source instructions 102 may comprise, for individual ones of the variables in the source instructions 102, a default value and/or type recommendation. A type recommendation is an indication as to how the author 104 intended the variable to be used. However, this declaration is not fixed or binding and is used as additional metadata in deciding whether a given dereferenced expression in context is provably invalid.

A type recommendation is a type that has been specified by the author 104 with respect to a variable. The type recommendation is a type which has been suggested by an author but which may be overridden by the type recommendation system in the case that a different type is inferred. The type recommendation is used as the type of the associated variable in the case that the type inference component fails.

Figure 5:
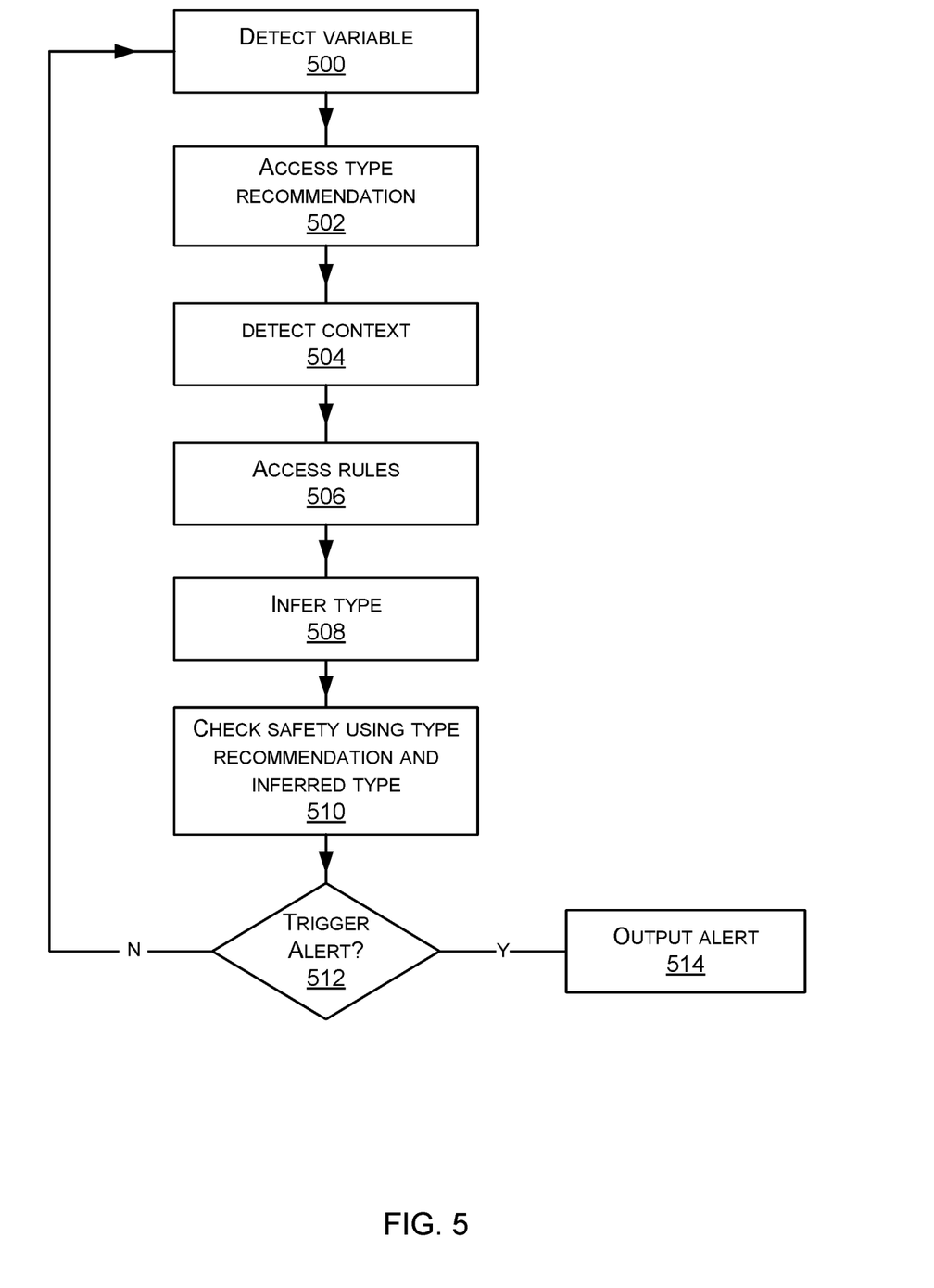
FIG. 5 is a flow diagram of a method of type checking carried out at compile time.

Static type checking at compile time is described with reference to FIG. 5. The type inference component detects 500 a variable during its process of computing the compiled instructions 118. It accesses 502 a type recommendation of the variable from the source instructions 102. It detects 504 one or more contexts of the detected variable as described above. The type inference component accesses 506 rules such as the if then rules mentioned above and uses those together with the detected context(s) and optionally priorities of the types, to infer 508 a type of the detected variable. The type inference component checks 510 type safety by using the type recommendation and the inferred type. Type safety is checked by checking whether the inferred type and the recommended type conflict with one another. A conflict is found when the recommended type can never be the same as the inferred type. If a conflict is found a decision is made at operation 512 to output an alert 514 and halt the compilation process on account of mathematical correctness of the source instructions being invalidated. The alert indicates to author 104 that there is a type safety problem and so the source instructions 102 are to be modified. If no conflict is found then no alert is triggered and the process returns to operation 500.

Type checking is carried out by the type inference component 210 at run time in some examples. Run time means at the time of execution of the compiled instructions. In this case the type inference component 210 carries out operations 500, 502, 504, 506 and 508 in the same manner as described above with reference to FIG. 5. When the type has been inferred at operation 508, a check is made for any incompatibility between the inferred type and the type recommendation. If an incompatibility is found a predefined type is used which is a default type that is known to be safe. Optionally an alert is given to the author 104 to indicate that the safe default type has been used. In some examples there is one safe default type and using the default safe type enables the compiled instructions to continue to execute rather than terminating execution. In other examples, there is one default safe type per context. By using one default safe type per context greater flexibility is achieved.

Figure 6:
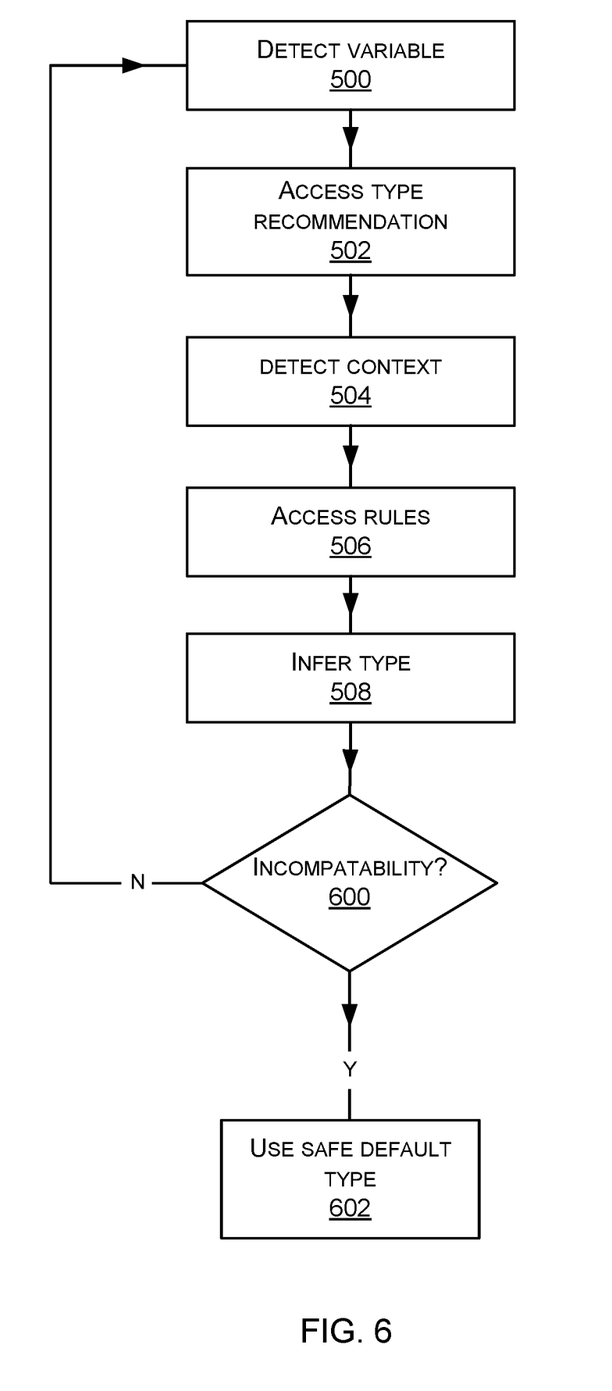
FIG. 6 is a flow diagram of a method of type checking carried out at run time.

If no incompatibility is found at check point 600 the process returns to operation 500.

An example of static type checking by the type inference component is now described. In this example the parameter bar (which is a variable) is given a default value which is the string goldenrod in the first line of the source instructions. At line 7 of the source instructions the parameter bar appears in an arithmetic expression for a width field of a user interface component template. The type inference component, detects the context of the parameter bar in the arithmetic expression for the width field. The context is a style context since the keyword style appears two lines before the parameter bar in the arithmetic expression. The type inference component has stored information indicating that a style context is compatible with types including numbers, the string 'auto', or an instance of the Keyword class with the value 'auto'. The type inference component infers that there is an incompatibility since the type recommendation of the default value is string, and there is no option for the style context to have variables of the type string. Therefore an alert is triggered and the compilation terminates.

```
${bar='goldenrod'}
<div>
  <style>
    :root {
      width: { $bar * 10}
    }
  </style>
</div>
```

An example is now described in which the source instructions comprise a user interface component template that declares input parameters (which are variables) at a top level and then uses those parameters in various contexts in the template. Each parameter represents dynamic input values that can change the look and feel of a user interface component when rendered or interacted with.

The first line of the source instructions declares the parameter foo, which has a default value being the integer 10, and also declares the parameter bar which has a default value being the string goldenrod. In this case there is a default value being the integer 10. However, the default value is optional as the author need not provide a default value. The presence of the default value indicates that the parameter is optional for users of the source instructions. An absence of the default value indicates the parameter facilitates a logically correct instantiation of the component. The default value of the parameter is different from the default values that the compiler uses for a parameter in the event of a failed type check, which are read from hardcoded internal defaults, if no specific default value is provided by the component author.

In the second line the type inference component detects the parameter foo. It detects the context of the parameter foo in the second line, which is a query predicate context since the keyword "query" is present in line 2. The type inference component has information about which types are available for a query predicate context and suppose these types include only the type integer. The type inference component infers the type of the parameter (variable) foo in the second line as being integer. In line three the source instructions comprise an instruction to print Hello followed by the parameter foo on the user interface component. In this case the parameter foo is inferred as having type integer. In line 6 the parameter bar appears as the value to the 'background-color' style. The type inference component detects the context of the parameter bar in line six as being a background-color style context since the keyword style appears in line 4 and the keyword background-color appears in line six. The type inference component has information specifying that a background-color style context is compatible with the type string or the type color class. The type inference component therefore infers the type of the parameter bar in line six as being a string containing a valid color expression or as being an actual instance of a color class.

```
${foo=10; bar : string = 'goldenrod'}
<div query="{$foo>5}">
  Hello $foo
  <style>
    :root {
      background-color: $bar;
      width: {
        $foo * 10
      }
    }
  </style>
</div>
```

Figure 7:
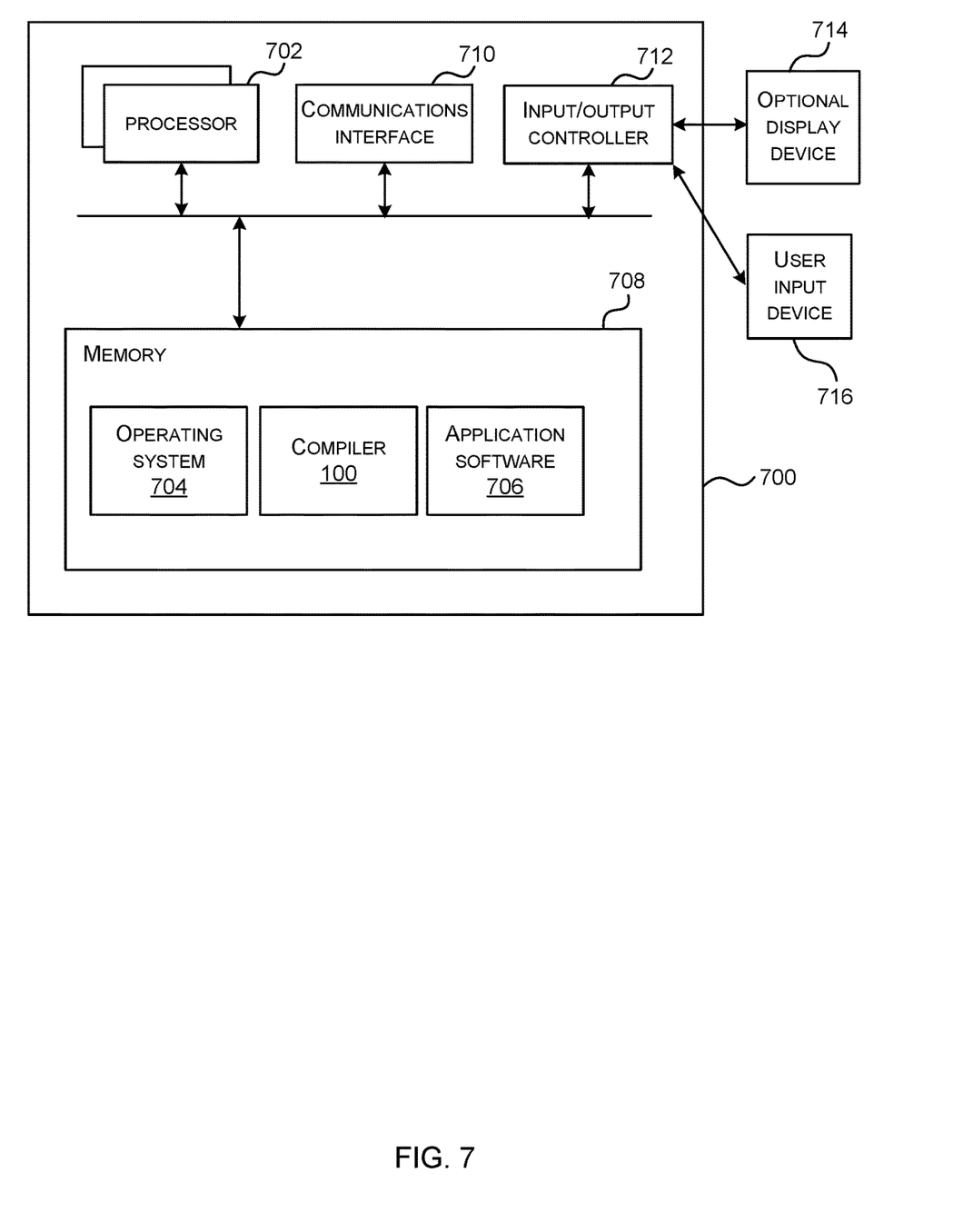
FIG. 7 illustrates an exemplary computing-based device in which embodiments of a compiler with type inference are implemented.

FIG. 7 illustrates various components of an exemplary computing-based device 700 which are implemented as any form of a computing and/or electronic device, and in which embodiments of a compiler with type inference are implemented in some examples.

Computing-based device 700 comprises one or more processors 702 which are microprocessors, controllers or any other suitable type of processors for processing computer executable instructions to control the operation of the device in order to compile source instructions into compiled instructions, whereby types of variable are inferred based on context of variables. In some examples, for example where a system on a chip architecture is used, the processors 702 include one or more fixed function blocks (also referred to as accelerators) which implement a part of the method of inferring types of variables based on context of the variables in source code, in hardware (rather than software or firmware). Platform software comprising an operating system 704 or any other suitable platform software is provided at the computing-based device to enable application software 706 to be executed on the device. A compiler 100 such as that described earlier in this document is implemented at the computing device 700.

The computer executable instructions are provided using any computer-readable media that is accessible by computing based device 700. Computer-readable media includes, for example, computer storage media such as memory 708 and communications media. Computer storage media, such as memory 708, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 708) is shown within the computing-based device 700 it will be appreciated that the storage is, in some examples, distributed or located remotely and accessed via a network or other communication link (e.g. using communication interface 710 such as a network card, a transceiver or other communication interface).

The computing-based device 700 also comprises an input/output controller 712 arranged to output display information to a display device 714 which may be separate from or integral to the computing-based device 700. The display information may provide a graphical user interface. The input/output controller 712 is also arranged to receive and process input from one or more devices, such as a user input device 716 (e.g. a mouse, keyboard, camera, microphone or other sensor). In some examples the user input device 716 detects voice input, user gestures or other user actions and provides a natural user interface (NUI). This user input may be used to specify source code to be compiled, view type checking alerts, edit and create source code, or for other purposes. In an embodiment the display device 714 also acts as the user input device 716 if it is a touch sensitive display device. The input/output controller 712 outputs data to devices other than the display device in some examples, e.g. a locally connected printing device.

Any of the input/output controller 712, display device 714 and the user input device 716 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

A context (e.g. generic computer system or operating environment) for the invention should be provided and described with respect to the last figure.

add broad-based definitions of significant claim terms

Alternatively or in addition to the other examples described herein, examples include any combination of the following:

A compiler comprising:

a processor configured to receive a computer program comprising a plurality of instructions, the instructions comprising one or more variables and context of the variables;

a type selector configured, upon evaluation of an instruction comprising a variable by the compiler, to infer a type of the variable using the context of the variable and to dereference the variable using the inferred type.

The compiler described above wherein the type selector is configured to infer the type such that the inferred type is transient and expires upon completion of the evaluation.

The compiler described above wherein the type selector is configured to disregard the inferred type upon completion of the evaluation. The type selector disregards the inferred type by not using the inferred type during further evaluation of the instructions. In this way the inferred type has no further influence on subsequent evaluation of the instructions.

The compiler described above wherein the type selector is configured to detect one or more contexts of a variable by searching for keywords in the source instructions.

The compiler described above wherein the type selector comprises, for each of a plurality of contexts, information about one or more types associated with the context.

The compiler described above wherein the information about types associated with the context is received from an author and comprises declarations of what types variables are covariant to for a given context in order for expressions comprising the variables to pass a type check.

The compiler described above wherein the plurality of contexts comprises: a style context, a text literal context, a query predicate context, an icon source context, an image source context, an import parameters context.

The compiler described above wherein at least one of the contexts has two or more associated types.

The compiler described above wherein the type inference component is configured to store priorities of the types and wherein the type inference component is configured to use the priorities during the inference.

The compiler described above wherein the type inference component is configured to carry out a type check of at least one of the variables prior to execution of the computer program, by accessing a recommended type of the variable from the instructions and comparing the recommended type and the types associated with the context of the variable.

The compiler described above wherein the type inference component is configured to terminate compilation of the computer program if the recommended type is incompatible with the types associated with the context of the variable.

The compiler described above wherein the type inference component is configured to carry out a type check of at least one of the variables during execution of the computer program, by accessing a recommended type of the variable from the instructions and comparing the recommended type and the types associated with the context of the variable, and if the recommended type is incompatible with the types associated with the context of the variable, using a default type for the variable and continuing with the execution of the computer program.

The compiler described above wherein the plurality of instructions defines a user interface component.

The compiler described above wherein the plurality of instructions comprises a template defining a user interface component and wherein the variables are parameters of the template.

A method of operation of a compiler comprising:

receiving a computer program comprising a plurality of instructions, the instructions comprising one or more variables and context of the variables;

evaluating at least one of the instructions comprising a variable and context of the variable, and, as part of the evaluation, inferring a type of the variable using the context of the variable.

The method described above wherein the type selector is configured to detect one or more contexts of the variable by searching for keywords in the source instructions.

The method described above comprising accessing, for each of a plurality of contexts, information about one or more types associated with the context.

The method described above comprising receiving the information about types associated with the context from an author.

The method described above comprising storing priorities of the types and using the priorities during the inference.

One or more computer-readable media with device-executable instructions that, when executed by a computing system, direct the computing system to perform operations comprising:

receiving a computer program comprising a plurality of instructions, the instructions comprising one or more variables and context of the variables;

evaluating at least one of the instructions comprising a variable and context of the variable, and, as part of the evaluation, inferring a type of the variable using the context of the variable; and disregarding the inferred type upon completion of the evaluation.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A compiler comprising:
   a processor configured to receive a computer program comprising instructions, the instructions comprising one or more variables and context of the one or more variables;
   a type selector for inferring, based at least on an evaluation of an instruction comprising a variable of the one or more variables by the compiler,
   a type of the variable using the context of the variable and dereference the variable using the inferred type; and
   a type inference component for carrying out a type check of the variable prior to execution of the computer program by accessing a recommended type of the variable from the instructions and terminate compilation of the computer program based at least on the recommended type being incompatible with types associated with the context of the variable.

2. The compiler of claim 1 wherein the type selector infers the type such that the inferred type is transient and expires upon completion of the evaluation.

3. The compiler of claim 1 wherein the type disregards the inferred type upon completion of the evaluation.

4. The compiler of claim 1 wherein the type selector is configured to detect one or more contexts of a variable by searching for keywords in source instructions.

5. The compiler of claim 4 wherein the one or more contexts comprises: a style context, a text literal context, a query predicate context, an icon source context, an image source context, an import parameters context.

6. The compiler of claim 4 wherein at least one of the contexts has two or more associated types.

7. The compiler of claim 4 wherein the contexts comprises one or more of the following: a style context, a text literal context, a query predicate context, an icon source context, an image source context, an import parameters context.

8. The compiler of claim 4 wherein the type inference component is configured to carry out a type check of variable during execution of the computer program, by accessing a recommended type of the variable from the instructions and comparing the recommended type and the types associated with the context of the variable, and if the recommended type is incompatible with the types associated with the context of the variable, using a default type for the variable and continuing with the execution of the computer program.

9. The compiler of claim 1 wherein the type selector comprises, for each of a plurality of contexts, information about one or more types associated with the context.

10. The compiler of claim 9 wherein the information about types associated with the context is received from an author and comprises declarations of what types variables are covariant to for a given context in order for expressions comprising the variables to pass a type check.

11. The compiler of claim 1 wherein the type inference component is configured to store priorities of the types and wherein the type inference component is configured to use the priorities during the inference.

12. The compiler of claim 1 wherein the instructions define a user interface component.

13. The compiler of claim 1 wherein the instructions comprise a template defining a user interface component and wherein the variables are parameters of the template.

14. A method of operation of a compiler comprising:
receiving, at a processor, a computer program comprising instructions, the instructions comprising one or more variables and context of the one or more variables;
evaluating at least one of the instructions comprising a variable and context of the variable, and, as part of the evaluation, inferring a type of the variable using the context of the variable and deference of the variable using the inferred type; and
carrying out a type check of the variable prior to execution of the computer program by accessing a recommended type of the variable from the instructions and terminate compilation of the computer program based at least on the recommended type being incompatible with types associated with the context of the variable.

15. The method of claim 14 wherein the method further comprises detecting one or more contexts of the variable by searching for keywords in source instructions.

16. The method of claim 14 further comprising accessing, for each of a plurality of contexts, information about one or more types associated with the context.

17. The method of claim 16 further comprising receiving the information about types associated with the context from an author.

18. The method of claim 14 further comprising storing priorities of the types and using the priorities during the inference.

19. One or more computer-readable storage devices comprising device-executable instructions that, when executed by a computing system, direct the computing system to perform operations comprising:
receiving a computer program comprising instructions, the instructions comprising one or more variables and context of the variables;
evaluating at least one of the instructions comprising a variable and context of the variable, and, as part of the evaluation, inferring a type of the variable using the context of the variable and deference of the variable using the inferred type; and
carrying out a type check of the variable prior to execution of the computer program by accessing a recommended type of the variable from the instructions and terminate compilation of the computer program based at least on the recommended type being incompatible with types associated with the context of the variable.

20. The one or more computer-readable storage devices of claim 19, wherein the device-executable instructions further direct the computing system to detect one or more contexts of a variable by searching for keywords in source instructions.

* * * * *